Dec. 2, 1930.  G. E. GARNO  1,783,420
CHUCK
Filed Dec. 27, 1926  2 Sheets-Sheet 1

Inventor
George E. Garno
By Geo. B. Kennedy Jr.
Attorney

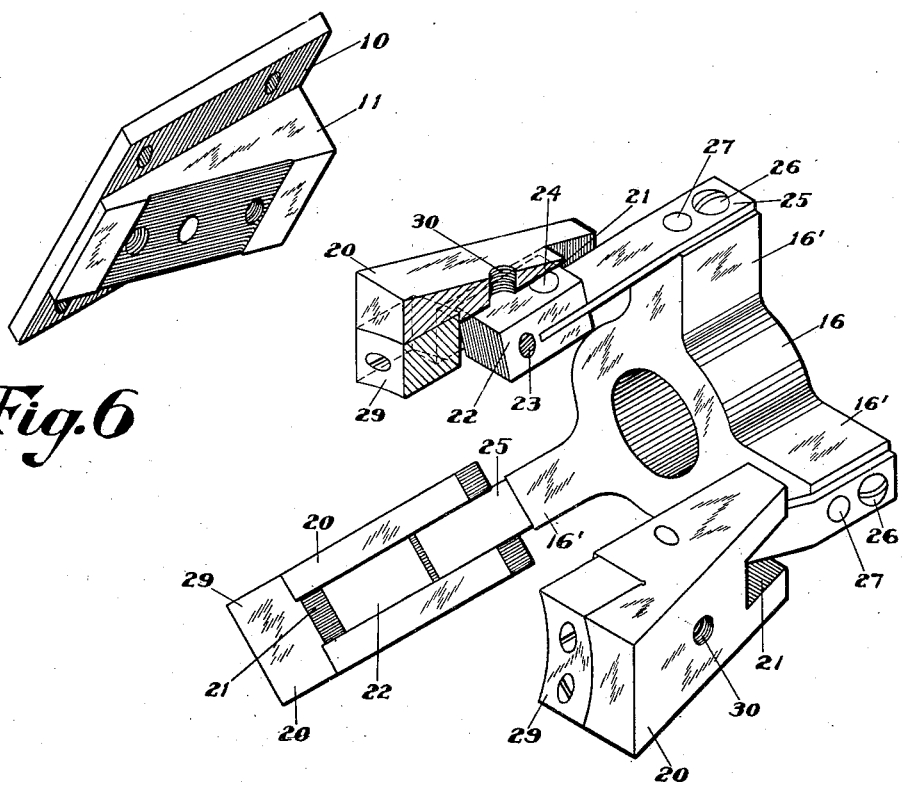

Patented Dec. 2, 1930

1,783,420

UNITED STATES PATENT OFFICE

GEORGE E. GARNO, OF WORCESTER, MASSACHUSETTS, ASSIGNOR TO THE HEALD MACHINE COMPANY, OF WORCESTER, MASSACHUSETTS, A CORPORATION OF MASSACHUSETTS

CHUCK

Application filed December 27, 1926. Serial No. 157,175.

The invention relates to chucks of the collet type and provides an improved means of actuating the jaws, whereby their gripping surfaces will be always parallel to (or more strictly, will contain lines parallel to) the axis of the chuck.

In the standard type of collet chuck the jaws are made integral with a ring, and when the ring is drawn into the chuck, the jaws are forced together by a conical hood or other encircling body. In case the work varies by even a small amount from the size for which the particular jaws have been ground, the jaws will contact the work at an angle, and hold the workpiece with only a point or a line contact.

According to the present invention, the jaws are not rigid with the member to which the chuck draw bar is attached, but are pivotally connected thereto. In one modification, the connection is made by a leaf spring and a pivot pin,—in the other modification by two pivot pins and a link. In either event the jaws will always grip the workpiece solidly, and not by point or line contact.

Another feature of the invention resides in the provision of interchangeable jaw pieces, all of which will fit the same set of jaws. Also the jaws themselves, in one modification of the invention, can be rigidly held against the bearing surfaces of the chuck, to enable these jaw pieces to be ground to fit a particular size of workpiece.

The above and further advantageous features of the invention will hereinafter more fully appear, reference being had to the accompanying drawings, in which:—

Fig. 5 is an isometric view of the jaws assembled on the actuating member, one jaw being cut away to show the pivotal block inside.

Fig. 6 is an isometric view of a wedge member for forcing the jaws inwardly.

Like reference characters refer to like parts in the different figures.

Figure 2:
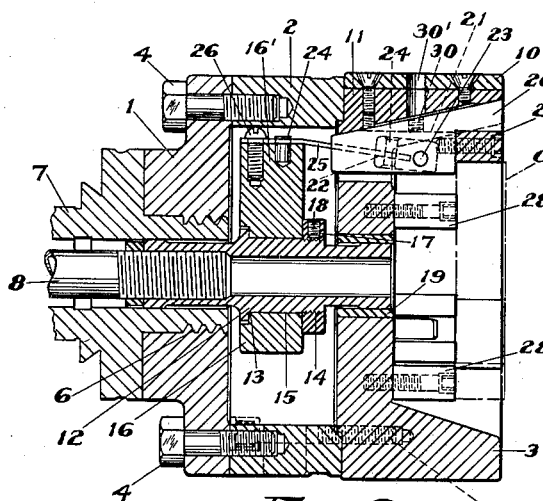
Fig. 2 is a sectional view on the line 2—2 of Fig. 1.
Figure 1:
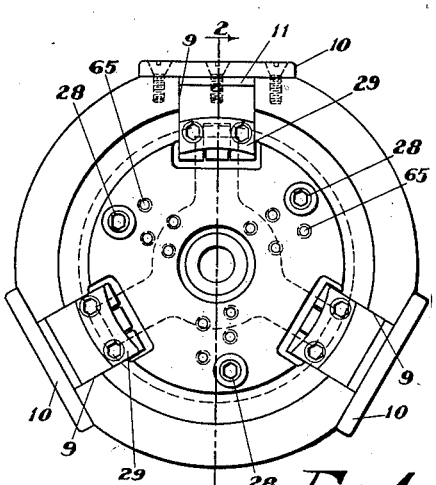
Fig. 1 is a front view of a chuck or work holding device constructed in accordance with the invention.

Referring first to Figs. 1 and 2, the casing of the chuck comprises a plate 1, a hollow cylindrical member 2 and a dish-shaped member 3. The cylindrical member 2 is fastened to the plate 1 by bolts 4, and the members 2 and 3 are likewise fastened together, as by means of screws 5. The plate 1 has a threaded bore 6, by means of which it is attached to the threaded front end of a work rotating shaft or spindle 7. Said spindle is hollow for the reception of a chuck actuating rod or draw bar 8, by the longitudinal movement of which the chuck is opened or closed.

The dish-shaped member 3 is slotted at 9, 9, 9, (Fig. 1), said slots being desirably equally spaced around the circle, that is to say, one hundred and twenty degrees apart. Said slots 9 are bridged by plates 10, 10, 10, which are fastened, as by countersunk screws, to the outside surface of the member 3. Detachably fastened to the plates 10 are wedge members 11, 11, 11. One plate 10 and member 11 are shown assembled in the isometric view of Fig. 6.

The front end of the rod 8 is screw threaded and has attached thereto a sleeve 12. The sleeve 12 provides a shoulder 13 and a short screw threaded portion 14, the latter being spaced from shoulder 13 by a cylindrical surface 15. A three armed member 16 fits over the surface 15 and is held in place on the sleeve by a nut 17 on the portion 14, the nut 17 being desirably provided with a locking screw 18. The front end of the sleeve 12 is slidably received by a bushing 19 in the dish-shaped casing member 3.

The three-armed member 16 is connected to and actuates the three jaws 20, 20, 20 of the chuck. Each jaw 20 is adapted to slide in one of the slots 9, and presses against the corresponding wedge member 11 in said slot. As best shown in Fig. 5, the inside portion of each jaw 20 has a longitudinal slot 21 therein, between the walls of which fits a block 22. Pins 23 connect the jaws to the blocks, said pins being tangent to a circle concentric with the chuck axis;—in this manner the blocks 22 can swing in radial planes relative to the jaws 20.

Firmly fastened to the blocks 22 by means of pins 24 are flat or leaf springs 25, 25, 25, the said leaf springs being tightly received in slots in said blocks. The other ends of the leaf springs are attached to the arms 16' of the three-armed member 16 by single screws 26 and pins 27. This mode of attachment allows the springs 25 to flex, but prevents side motion.

When the rod 8 is moved to the right, Fig. 2, the chuck is open, because the member 16, being in its farthest front position, the jaws 20 are moved towards the small end of the wedges 11, the springs 25 serving to distend the jaws. In this position of the chuck, the workpiece $a$ to be operated upon is placed in the chuck, against work locating plugs 28, which are detachably secured to the interior plane surface of the member 3. The draw bar 8 is then moved to the left, Fig. 2, whereupon the jaws 20 are pulled inwardly, and because of the inclined planes or wedges 11, they approach the axis of the chuck. Thereupon the detachable work-engaging pieces 29 of said jaws, ground for the particular size of workpiece $a$ to be operated upon, grip the workpiece, it being understood that the rod 8 is held to the left by a powerful spring, not shown, since such is ordinarily used in connection with draw bar chucks.

As the jaws 20 and their attached pieces 29 approach the workpiece $a$, they always remain parallel to each other, since the incline on the wedge 11 is a plane; the flat or leaf springs readily bend, and the blocks 22 swivel, allowing the maintenance of full surface contact between the workpiece $a$ and the jaw pieces 29.

These jaw pieces 29 are provided in sets of different sizes, and each set of jaw pieces may be ground to exactly fit the particular size of workpiece for which they are intended. The jaws 20 have threaded holes 30 for the purpose of drawing them firmly against the wedges 11, so that a seat for the jaw pieces 29 may be accurately finished in order to insure the interchangeability of said jaw pieces. The jaw pieces are now fitted to the jaws and ground to suit the work. When a set of jaw pieces is being ground, the jaws are drawn outwardly against the wedges 11 by means of screws passing through holes 30', so that the jaws will be held in the positions that they assume when the chuck is gripping a workpiece.

Figure 4:
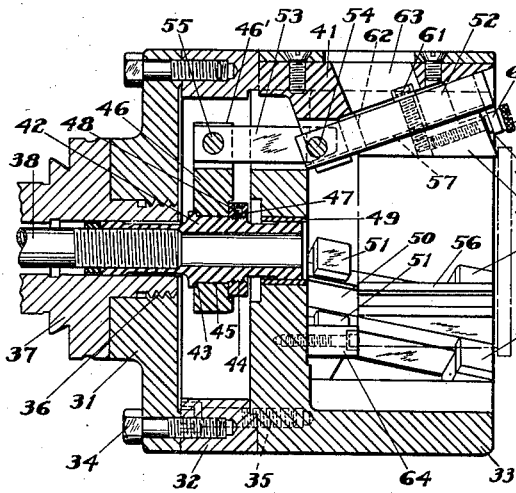
Fig. 4 is a sectional view on the line 4—4 of Fig. 3.
Figure 3:
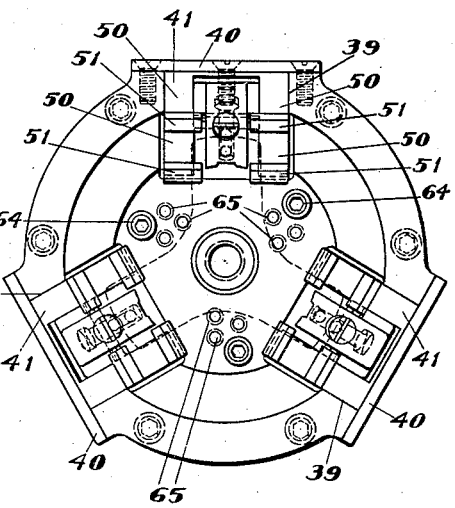
Fig. 3 is a view similar to Fig. 1, showing a modified form of chuck or work holding device.

Referring now to Figs. 3 and 4, in the modified form of chuck, a plate 31 is attached to a hollow cylindrical member 32 by bolts 34, the hollow member 32 being in turn attached to member 33 by screws 35. The plate 31 has a threaded bore 36, by means of which it is attached to the threaded front end of a work rotating shaft or spindle 37, said spindle receiving a draw bar 38. The parts so far described are generally similar to the parts 1—8 of the first form of the invention, although not necessarily interchangeable therewith.

The chuck member 33 is slotted at 39, 39, 39, said slots being equally spaced. The slots are bridged by plates 40, 40, 40, which, as in the case of plates 10, serve to hold wedge members 41, 41, 41 in position. A sleeve 42 is attached to the front end of rod 38, this sleeve also having a shoulder 43, a screw threaded portion 44 and a cylindrical surface 45, and a three-armed member 46 fits on the sleeve and is held in place by a nut 47. A set screw 48 holds the nut in place. A journal 49 centrally located in the member 33 slidably receives the end of sleeve 42.

The wedge members 41 each have four inwardly extending projections 50, each of said projections being provided with plates 51. Plates 51 extend over the sides of the projections towards each other and form, together with the interior surface of the wedge member 41, guideways for three members 52, which are substantially rectangular parallelopipeds. The members 52 are each connected to ears 46' formed on the three-armed member 46, the connection being made by links 53. The links 53 connect to the members 52 by means of pivot pins 54, and to the ears 46' by means of pins 55. The end of members 52 are forked to receive the links.

As in the case of the first embodiment of the invention, movement of the draw bar 38 to the right opens the chuck, as the members 52 are moved forwardly on the inclined guideways formed by the wedge members 41 and the plates 51. Conversely, movement of the draw bar to the left moves the members back in the inclined guideways. Jaw pieces 56 are attached to each member 52, and compared with the jaw pieces 29 of Figs. 1 and 2, it will be seen that these jaw pieces are comparatively long, and therefore the chuck shown in Figs. 3 and 4 is adapted for longer work than the chuck of Figs. 1 and 2.

The jaw pieces 56 fit in grooves 57 (best shown by the dotted line in Fig. 4) on the inward side of member 52. They may be adjusted longitudinally in said groove by thumb screws 58, which are provided with collar portions 59. U shaped guide pieces 60, attached to and extending inwardly from the members 52, surround the collars 59 and thus hold the screws 58 in position relative to said members. It will be seen that by turning the screws 58, the jaw pieces 56 can be adjusted inwardly or outwardly of the chuck, and as they are moved inwardly, they will approach, because of the inclined position of members 52. When the jaw pieces 56 have been properly adjusted for a given size of workpiece, they are firmly clamped in position on the member 52 by screws 61, the heads of which project above long slots 62 formed in members 52. For the purpose of getting at these screws 61, the members 41 likewise provide long slots 63 just above the slots 62.

The chuck of Figs. 3 and 4 is provided with removable backing plugs 64, the same as the plugs 28 of the first form of the invention. In both modifications extra holes 65 are provided in the members 3 and 33, respectively, to locate the plugs in different positions for different sizes of workpieces.

I claim:

1. In a chuck, a member slidably mounted in said chuck, work gripping jaws, inclined plane means to force said jaws together, flat springs attached to said member and therefore movable with it, and blocks pivotally carried by said jaws, one end of said flat springs being fastened to said blocks whereby said jaws may be drawn into said chuck by movement of said slidable member transmitted through tensile pull of said flat springs, but flexure of said flat springs allowing elements on said jaws to remain parallel to the surface of the work piece to be engaged.

2. In a chuck, a plurality of members rigidly fastened to said chuck having inclined plane inner surfaces facing inwardly of said chuck whose ends farthest in said chuck are nearest the center thereof, a plurality of jaws, means to slide said jaws forwardly and rearwardly in contact with said inclined plane members, jaw pieces detachably fastened to said jaws, and screw means to draw said jaws in fixed position hard against said inclined plane members whereby said jaw pieces may be ground to true concentricity with the axis of said chuck.

3. In a chuck, a member mounted for axial movement therein, a set of work gripping jaws mounted for sliding movement in said chuck, inclined plane means contacting said jaws, and flat springs connected to said member mounted for axial movement and connected to said jaws, in order to draw said jaws inwardly of said chuck by movement of said member, the flexing of said flat springs allowing elements of said jaws to remain in parallel relation to each other and to elements of the surface of the workpiece.

4. In a chuck, a plurality of inclined plane portions formed in the body thereof, a plurality of jaws having complementary inclined plane portions, a plurality of jaw pieces detachably fastened to said jaws, a plurality of holes in the chuck body communicating with the first named inclined portions, and a plurality of tapped threaded holes in the jaws, whereby the jaws may be drawn firmly against the inclined plane portions, each one in a definite position of adjustment, in order that the detachable jaw pieces may be ground so as to accurately hold a workpiece.

Dated this 23rd day of December, 1926.

GEORGE E. GARNO.